March 20, 1962 C. A. MASON 3,025,853
FIXATION DEVICE FOR FRACTURED FEMUR
Filed July 7, 1958 2 Sheets-Sheet 1

CHRISTOPHER A. MASON
INVENTOR.

BY Paul A. Weilein
ATTORNEY.

March 20, 1962  C. A. MASON  3,025,853
FIXATION DEVICE FOR FRACTURED FEMUR
Filed July 7, 1958  2 Sheets-Sheet 2
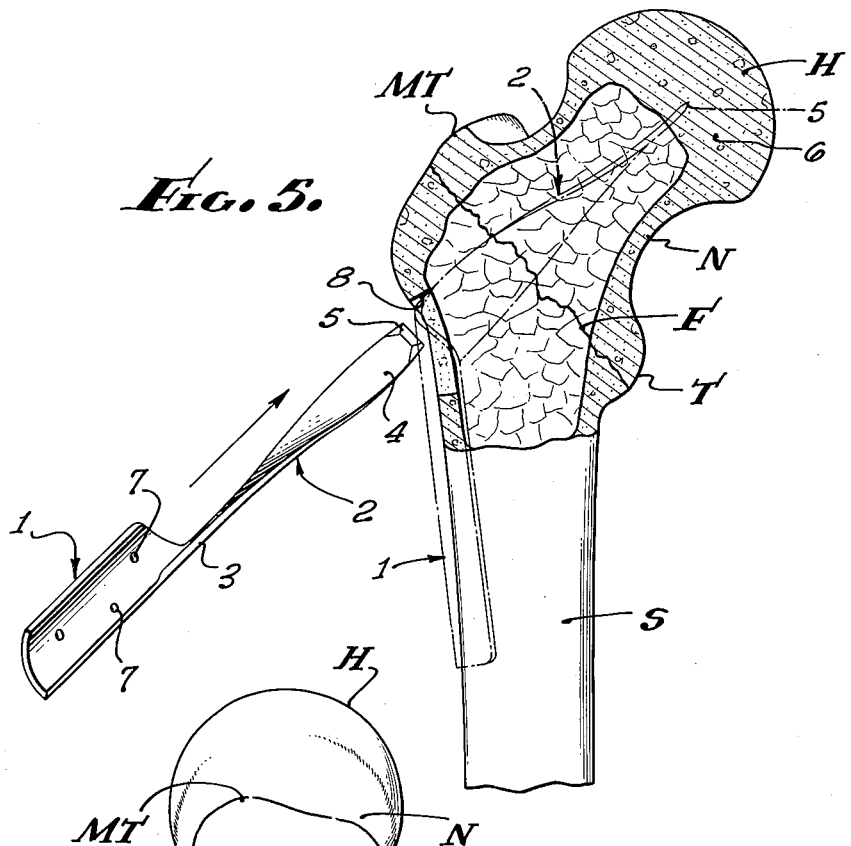
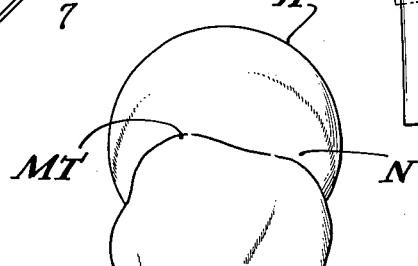
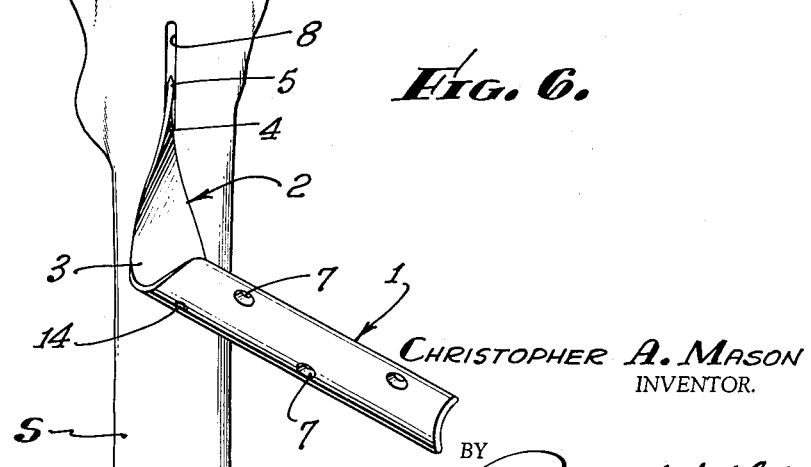
CHRISTOPHER A. MASON
INVENTOR.
BY Paul A. Weilein
ATTORNEY.

United States Patent Office 3,025,853
Patented Mar. 20, 1962

3,025,853
FIXATION DEVICE FOR FRACTURED FEMUR
Christopher A. Mason, 3046 Hollycrest,
Los Angeles, Calif.
Filed July 7, 1958, Ser. No. 747,014
4 Claims. (Cl. 128—92)

The present invention relates to femoral nails or hip nails and more particularly to such a device which affords certain procedural and structural advantages never before afforded by devices of this type.

In the treatment and repair of hip fractures, i.e., fractures of the neck of the femur, it has become common practice in the medical profession to employ a hip or femoral nail to mechanically fix the fractured fragment to enable knitting or mending of the bone structure.

Conventionally, femoral nails for use in the case of intertrochanteric and neck fractures comprise a base plate adapted to engage the lateral aspect of the subtrochanteric shaft portion of the thigh bone or femur, the base plate having a nail projecting therefrom and adapted to extend through the lateral cortex, through the neck and into the head of the femur to act as a fixation element enabling healing of the fracture or fractures while at the same time allowing mobility of the hip joint.

In the utilization of such nails the surgeon, after exposing the lateral portion of the femur, approximates the angle at which he anticipates the nail portion is to be inserted so as to properly contact the head of the femur. He then forms a hole or crossed slot or the like in the thin shell of hard bone on the femoral shaft just below the major trochanter and inserts the nail portion into the hole or crossed slot. Precise estimation of the angular displacement or drift of the femoral shaft with relation to the head is necessary in order for proper direction of the nail to be attained. Practice indicates that the skilled and experienced surgeon encounters substantial difficulty in initially estimating the precise angle at which the nail must be inserted through the opening. Failing in this, the nail must be manipulated or the base or attachment plate wil not be properly related to the femoral shaft upon driving the nail into the head; nor will the nail be properly positioned so as to afford strong fixation.

Within the thin shell of the femur is a fatty material which permits of ease of nail manipulation. However, the nails heretofore available for this purpose, by virtue of their structure, create certain problems which render manipulation of the nail dangerous and impractical. In my Patent No. 2,874,691, dated February 24, 1959, an improvement in femoral nails is disclosed and claimed, wherein certain of the problems encountered during manipulation of the nail in fixing femoral fractures are obviated.

The present invention contemplates a further improvement over conventional nails and is particularly well suited for application where extreme varus strains are contemplated.

Prior nails of the most widely known and used types have required the formation of a rather large opening in the lateral wall of the femoral shaft. This opening of necessity is located just below the major or greater trochanter, where, because of the bone structure, the hole formation substantially and critically weakens the bony substance at a point where such weakness can be ill afforded. The hard bone shell at this point is extremely thin and the effective area is quite limited. Should any error be made in the location of the opening, correction of the location further critically weakens the bone. Manipulation of nails commonly employed heretofore for correction of the angle and location, has been known to splinter and crack the bone surrounding the opening. In some instances enlargement of the hole in the shaft and/or manipulation of the nail in a misplaced opening has been known to cause the remaining bone structure to fracture during the operation or to fracture following the operation, causing the shaft to drift medially with resultant severe complications.

Moreover, in some instances if the surgeon be inaccurate in the placement of the opening and nevertheless drives the point into the femur, the nail plate may not be properly located so as to afford maximum support where such support is required, and the fixation will accordingly be ineffectual, thus necessitating further operative work to correct drift of the femoral shaft.

With these and other problems in view, an object of the present invention is to provide a femoral nail which obviates certain of the shortcomings and disadvantages of the structures of the prior nails.

A primary object of the present invention is to provide a femoral nail which may be inserted through a relatively narrow slot extending longitudinally of the subtrochanteric shaft of a femur, the nail being constituted by a comparatively thin deep structural member formed on a helix so that the nail may be inserted through the thin slot in the subtrochanteric shaft of the femur and will rotate in accordance with the helix of the nail as it is being inserted through the slot and into the femoral neck and head.

In accordance with the above objective, a further object is to provide a nail which requires a relatively narrow slot in the femoral shaft for insertion, but which when inserted provides a comparatively large supporting area for sustaining loads imposed upon the femoral head.

As a result of the accomplishment of the just mentioned objectives, non-critical, i.e., relative non-weakening, insertion of the nail into the femoral neck is facilitated. In addition, the direction of the nail may be corrected subsequent to insertion without requiring the cutting of a new opening or otherwise enlarging the existing opening with attendant weakening or possible fracture of the femur in the subtrochanteric region. Moreover, this is accomplished with minimum reduction of strength of the lateral tension member of the femur in relation to varus strain imposed thereon.

A further advantage of the thin cross sectional configuration of the nail of the present invention resides in the fact that a very simple point may be provided on the nail, with the thin sectional configuration enabling ease of search and entrance of the nail into the proximal fragment of the femur if it should be offset or if incomplete reduction of the fracture should exist at the time of traverse of the fracture site by the point of the nail. The thin slot in the hard bony structure of the femoral shaft may be only slightly wider than the cross section of the nail, but the nail will be free for elevation and depression or posterior or anterior manipulation at any stage during its entrance into the femoral neck and the helically twisted nail will not bind even though it may fit closely within the slot. This construction also substantially facilitates removal of the nail following healing of the fractured femur.

The principal strain to which the juncture between the femoral nail and its supporting plate is subjected is varus strain, i.e., the strain tending to produce abnormal angulation of the femur at the fracture. Accordingly, a further object of the invention is to provide a nail and plate juncture construction which provides a large vertical area for providing substantial rigidity and resisting bending of the nail at the juncture with the attachment plate.

Another object is to provide an attachment plate which is adapted to lie predominantly upon the anterior or posterior aspect of the femur, depending upon whether the nail be applied to a right or left femur, with a minimum of lateral prominence of the attachment plate. In accomplishing this objective, the nail portion is formed integral with the supporting plate and projects from one edge thereof, the plate projecting substantially laterally with respect to the nail itself. The attachment plate is arched so as to substantially conform to the femur configuration but engages principally at its vertical edges with the femur so that varus strains imparted to the plate are borne to a much greater extent in an edgewise direction of the plate than in the case of conventional arched or flat attachment plates wherein the nail projects from the vertical center of the plate. The engagement of the nail supporting plate at the anterior lateral aspect of the femur or at the posterior lateral aspect of the femur may be accomplished by the provision of oppositely constructed femoral nails and in either case, a highly desirable benefit will be derived therefrom by reason of the resistance to varus strain, particularly in low or subtrochanteric fractures. As distinguished from this, all previous nail plates have been mounted upon the femur directly on the lateral aspect and extending generally normal to the maximum deforming strain, as distinguished from being disposed edgewise to the maximum deforming strain.

Heretofore, difficulty has been encountered in removing femoral nails following healing of a fractured femur. Therefore, a further object is to provide a femoral nail of novel construction which not only facilitates application as aforesaid, but which also facilitates removal without necessitating the use of pulling tools or the like. In this connection the nail of the present invention is formed on a perfect taper, whereby when the nail is to be removed, it may merely be tapped with a hammer or other tool on the attachment plate, and the nail will be jarred from the socket formed thereby sufficiently to enable simple manual extraction thereof, the tapered nail in such a case being free from binding with the surrounding bone structure.

Other objects and advantages will be hereinafter described or will become apparent to those skilled in the art to which the invention appertains and the novel features thereof will be defined in the appended claims.

Figure 1:
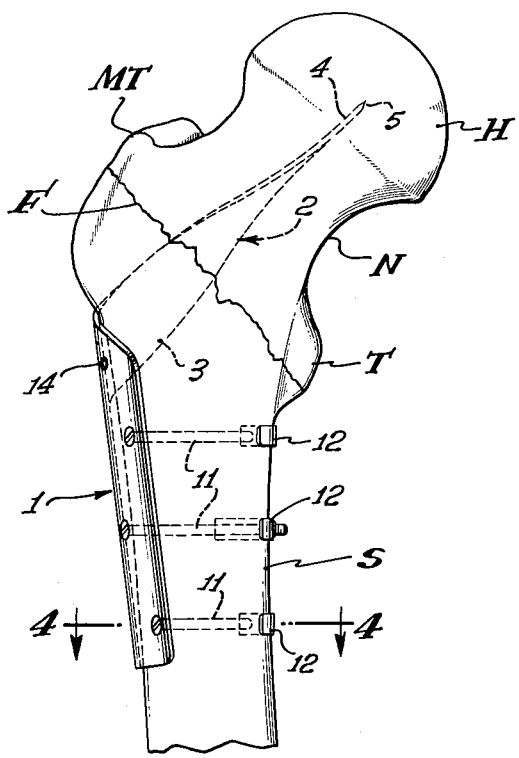
FIG. 1 is a view in elevation of the head of a femur, as viewed in an anterior aspect with a femoral nail made in accordance with the invention secured thereto as a fixation element for treatment of an intertrochanteric fracture.

FIG. 5 is a view depicting a femoral head partly in section and partly in elevation with a femoral nail embodying the invention, as shown in full lines in a position prior to insertion into the subtrochanteric lateral region of the femur, and with the femoral nail shown in broken lines in an applied position; and FIG. 6 is a view similar to FIG. 5 but showing the femoral head in elevation from its lateral aspect with the femoral nail of the invention shown in position for insertion into the femur.

Like reference characters in the several views of the drawings and in the following description designate corresponding parts.

The head portion of a femur is depicted in FIG. 1 as viewed anteriorly and includes a shaft S on which a head H is connected by a neck N, the femur having a trochanter T projecting laterally inwardly from the juncture of the neck with the shaft, and a major or greater trochanter MT projecting laterally outwardly at the juncture of the neck and the shaft. As illustrated, the femur is fractured on the line F which denotes an intertrochanteric fracture, that is, a fracture extending across the femur from the trochanter T through the major trochanter MT. The major strain imposed upon the fractured femur, as indicated in FIG. 1, is a varus strain which would have a tendency to cause undue angularity of the neck relative to the shaft of the femur. Therefore it is highly desirable that a fixation element be employed to traverse the fracture and be embedded in the hard bony substance of the head H while engaging the shaft S in such a manner as to rigidly support the head and neck of the femur.

Figure 4:
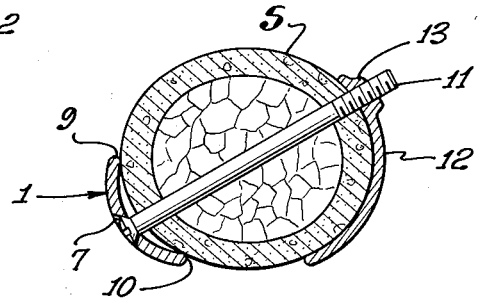
FIG. 4 is a horizontal sectional view on an enlarged scale as taken on the line 4—4 of FIG. 1.

Such a fixation element is shown in the drawings and comprises a supporting plate portion 1 and a nail portion 2. The supporting plate portion is an elongated transversely arched member as best seen in FIG. 4. Projecting from the upper end of the plate member 1 and from a lateral edge thereof the nail portion 2 has a vertically disposed section 3 of substantial depth but of comparatively thin cross section extending parallel to the longitudinal center of the base plate 1, as clearly illustrated in FIG. 2.

Because the nail portion 2 projects from a lateral edge of the plate portion 1, it will be recognized that forging of the fixation element or femoral nail as a unit is a comparatively simple operation, and as a result of unitary forging of the structure, extreme rigidity and strength of the juncture of the nail portion 2 with the plate portion 1 is assured.

The nail portion 2 preferably projects at an angle relative to the plate portion 1 of approximately 125° to 135°, which is an angle closely approximating the angle defined by the shaft S and the neck and head N and H of the femur. The relatively thin deep nail portion 3 is substantially planar for a short distance from the juncture with the plate portion 1, and then is twisted into approximately one-quarter of a helix so that the free extremity 4 of the nail portion 2 is disposed normal to the plane of the thin deep section 3 of the nail. In addition, the nail tapers equally at opposite sides of its longitudinal center, gradually from the juncture with the supporting plate 1 towards its free extremity and is provided at its extremity with a bevelled sharp edge 5 adapted to be driven into the hard bony substance 6, as shown in FIG. 5, of the head H of the femur.

The supporting plate portion 1 of the femoral nail is also provided with a suitable number of longitudinally spaced countersunk screw openings 7, which preferably have their axes disposed at staggered angles, as will hereinafter more particularly appear.

During an operation to reduce the femoral fracture and install a fixation element, a surgeon will expose the lateral aspect of the femur, as shown in FIG. 6, and form a comparatively narrow slot 8 in the cortex at the subtrochanteric lateral region of the femur, this being a hard bony region of comparatively narrow extent so that the provision of a narrow slot is of the utmost importance.

In the use of prior nails wherein the nail portion of the fixation member joined the supporting plate in a transverse direction with respect to the plate, the provision of a broad slot in the femur extending well into the posterior and anterior aspects of the femur is required, but the bony substance of the femoral shaft at these latter aspects is substantially weaker than at a medial vertical zone extending down the lateral aspect. Therefore insufficient bony structure is provided for guidance of the nail or strong resistance to fracture of the femoral shaft at the slotted zone.

Since the point of the nail of the invention is disposed substantially on a plane normal to the thin deep juncture portion 3 of the nail and the intervening nail portion between the point 5 and the juncture portion 3 of the nail is helically turned one-quarter of a revolution, the nail of the invention in use will be presented to the slot 8, as particularly shown in FIGS. 5 and 6, and during insertion of the nail portion 2 through the soft fatty substance in the hollow intertrochanteric region of the femur the helical section of the nail will effect rotation of the nail so that as the thin deep section 3 of the nail moves into the slot 8 the supporting plate portion 1 will be disposed lengthwise of the femoral shaft. However, since the nail portion 2 is formed at a lateral edge of the supporting plate portion 1, the body of the plate 1 will be disposed essentially at the anterior aspect of the femoral shaft and, as viewed particularly in FIG. 4, the supporting plate 1 will have edge contact at 9 with the lateral aspect of the shaft substantially medially of the shaft, while the plate 1 will have edge contact at 10 with the anterior lateral aspect of the shaft S.

Figure 2:
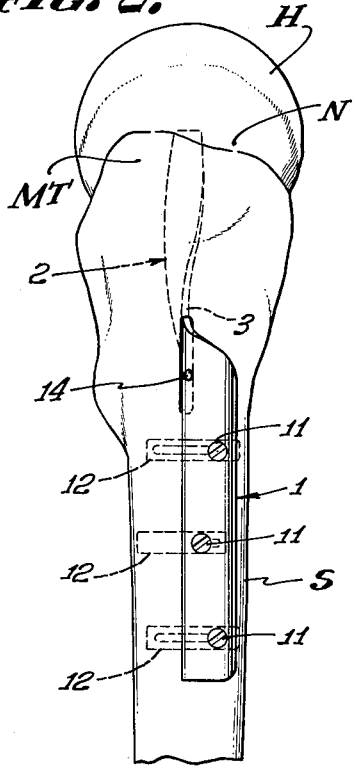
FIG. 2 is a view in elevation showing the lateral aspect of the femur head of FIG. 1.

In order to securely fix the plate 1 to the femoral shaft, screws 11 extend through the countersunk screw head recesses 7, through the shaft S and are secured at the opposite side of the femoral shaft by arcuate retainers 12 which extend circumferentially about the shaft a substantial distance, and which are provided with a threaded enlargement as at 13 for reception of the fasteners 11. As best seen in FIG. 2, a staggered angularity of the screws 11 is effected so that the uppermost and lowermost screws project from the anterior aspect of the shaft, across the shaft and through the posterior aspect of the shaft, crossing the center of the shaft while the intermediate screw 11 extends through the shaft completely to the anterior side of the shaft.

Edge contact of the supporting plates 1, as at 9 and 10, substantially enhances the strength of the femoral nail of the invention in resisting varus strains as previously referred to. Moreover, tendency of the juncture of the nail portion 2 with the plate portion 1 to yield under extreme varus loads will accentuate the edge contact of the plate 1 with the femoral shaft, whereas in the case of conventional femoral nails, wherein the nail is joined to the plate in such a manner that the plate engages the full lateral aspect of the shaft, the resistance to the breakage is substantially less than in the case of the instant invention.

It will be recognized that the helical twist of the nail portion 2 may be in a right hand direction or in a left hand direction and that the plate portion may be disposed on the anterior lateral aspect of either a right or left femoral shaft. However, if desired, helical twists of the same hand may be employed in the nails for use on both the right and the left hip, and as in the construction, on one hip the plate will be disposed at the anterior lateral aspect of the shaft while at the other hip the plate will be disposed at the posterior lateral aspect of the hip.

Figure 3:
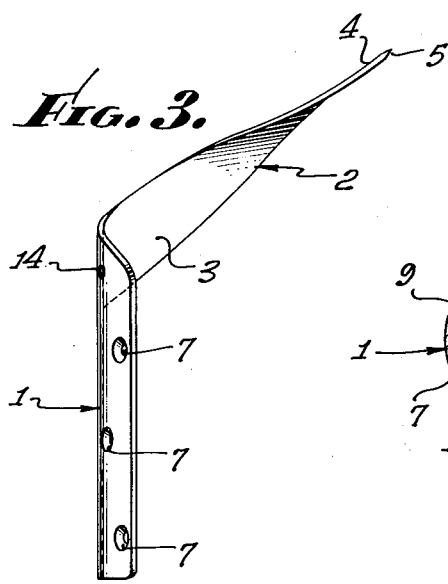
FIG. 3 is an elevational view of the femoral nail of the invention.

As is best seen in FIGS. 2 and 3, the plate portion 1 is provided with a punch recess 14 which is centered with respect to the nail portion 2. Accordingly, in driving the nail into the femoral head, a punch type tool, not shown, may be engaged in the recess 14 in alignment with the axis of the nail portion 2. Striking of the punch with a mallet will drive the nail during the final stages without creating torque tending to disturb the head-neck relationship.

Other modifications, alterations or changes may be resorted to without departing from the spirit of the invention as defined in the appended claims.

I claim:
1. A femoral nail comprising: a longitudinally extended base plate adapted to be attached to the subtrochanteric shaft of a femur, and a nail projecting from said base plate for insertion into the head of a femur, said nail having a portion of relatively thin deep cross section joined to said base plate along the upper lateral edge of said base plate, said nail having a free end spaced from said portion joining the plate, and a helically twisted section intermediate said free end and said portion joining said plate.

2. A femoral nail comprising: a unitary forging including a longitudinally extended base plate adapted to be secured to the subtrochanteric shaft of a femur, and a nail portion projecting at an angle from the base plate along a lateral edge of said plate, said nail portion having a free end for insertion into a femoral head, said nail portion being a flat member twisted through one-quarter of a helix between said plate and the free end of said nail portion.

3. A femoral nail comprising a base plate adapted to be connected to the subtrochanteric shaft of a femur, and a nail projecting from said plate from a lateral edge of the latter for insertion into the head of a femur, said nail being of relatively thin deep cross section and tapered from the base plate at a uniform taper on opposite sides of its center, said nail being provided with a helically twisted section.

4. A femoral nail comprising: a longitudinally extended base plate adapted to be attached to the subtrochanteric shaft of a femur, and a nail projecting from said base plate for insertion into the head of a femur, said nail having a portion of relatively thin deep cross section joined to said base plate along the upper lateral edge of said base plate, said nail having a free end spaced from said portion joining the plate, and a helically twisted section intermediate said free end and said portion joining said plate, said base plate having a tool receiving recess located in alignment with the center of said nail portion.

References Cited in the file of this patent

UNITED STATES PATENTS

| | | |
|---|---|---|
| 2,561,550 | Wright | July 24, 1951 |
| 2,761,444 | Luck | Sept. 4, 1956 |
| 2,834,342 | Yost | May 13, 1958 |
| 2,874,691 | Mason | Feb. 24, 1959 |

FOREIGN PATENTS

| | | |
|---|---|---|
| 1,037,169 | France | Apr. 29, 1953 |

OTHER REFERENCES

Nixon Surgical Supply Advertisement, Journal of Bone and Joint Surgery, October 1950, page 12. (Copy available in Science Library.)